July 28, 1953  F. H. MUELLER ET AL  2,646,699
DRILLING MACHINE
Filed Oct. 23, 1951  3 Sheets-Sheet 2

INVENTOR
FRANK H. MUELLER
JOHN J. SMITH
BY Cushman, Darby & Cushman
ATTORNEY

July 28, 1953     J. P. TEMPLEMAN     2,646,695
RAILWAY CAR HAND BRAKE

Filed Sept. 16, 1950     3 Sheets-Sheet 3

Inventor.
John P. Templeman.
By Wilkinson Huxley Byrne & Hume
Attys.

Patented July 28, 1953

2,646,699

UNITED STATES PATENT OFFICE 2,646,699

DRILLING MACHINE

Frank H. Mueller and John J. Smith, Decatur, Ill., assignors to Mueller Co., Decatur, Ill., a corporation of Illinois Application October 23, 1951, Serial No. 252,704

12 Claims. (Cl. 77—37)

This invention relates to drilling machines for drilling or tapping mains and pipes, and more particularly to improvements in drilling machines of the type shown in U. S. Patents Nos. 1,956,129 and 2,470,044 to Mueller et al. and Mueller et al., respectively.

Drilling machines of this type are provided with feed mechanism having an automatic drive for advancing the boring bar, and the cutting tool carried thereby, at a rate appropriate for a cutting operation. The automatic drive includes a clutch so that, upon disengagement thereof, hand advance of the boring bar can be accomplished by rotation of a crank handle connected to appropriate elements of the feed mechanism. Advance of the boring bar by hand is usually at a much faster rate than that effected by the automatic drive in order to obtain rapid advance of the cutting tool from its fully retracted position into contact with the work.

This invention pertains especially to improvements in means for accurately measuring the extent of advance of the cutting tool in drilling machines of this character. The machine disclosed in the aforementioned Patent No. 2,470,044 shows a counter for measuring the advance of the projectible boring bar. Such counter is operable, however, only when the machine is adjusted for automatic drive of the feed mechanism, which adjustment normally is made after the cutting tool has been advanced, by hand, into contact with the pipe to be drilled. The machine does not have provision for measuring the axial movement of the cutting tool from its fully retracted position up to the point where such cutting tool contacts the pipe. Hence, the operator of the machine might be confused by the readings of the counter, since it is essential to reset the same to zero at the time that the cutting tool is in contact with the pipe and the machine is adjusted to engage its automatic drive for the feed mechanism.

Therefore, it is an object of this invention to provide a drilling machine of the type described with a counter for accurately measuring the advance of the cutting tool, irrespective of whether the machine is adjusted for automatic or for hand drive of the feed mechanism.

It is another object of this invention to provide a drilling machine of the type described with driving means for an axial measuring device that automatically compensates for the difference between the rates of hand feed and automatic feed of the boring bar.

It is another object of this invention to provide a drilling machine of the type described with means for accurately measuring the advance of the cutting tool, irrespective of whether the machine is adjusted for hand or automatic feed and, further, with means for automatically arresting the automatic feed of the cutting tool after a predetermined advance thereof.

It is still another object of this invention to provide an improved drilling machine with constantly-operative means for measuring axial movement of the cutting tool, with means operative upon a predetermined advance of the cutting tool for arresting the automatic feed thereof, and with means for automatically feeding the boring bar at a rate suitable for tapping operations, such rate differing from those of both the hand and normal automatic feed.

It is a further object of this invention to provide an improved drilling machine of simple, and consequently relatively inexpensive, construction and design for accomplishing the above objects.

Other objects and advantages of the invention will be apparent from the following description and accompanying drawings, in which:

Figure 3 is a fragmentary side elevational view of the machine shown in Figure 1. Portions of the drive for the counting device are shown in section in order to illustrate details more clearly.

Figures 4 and 5 are sectional views taken upon the corresponding section lines of Figure 3.

Figure 1:
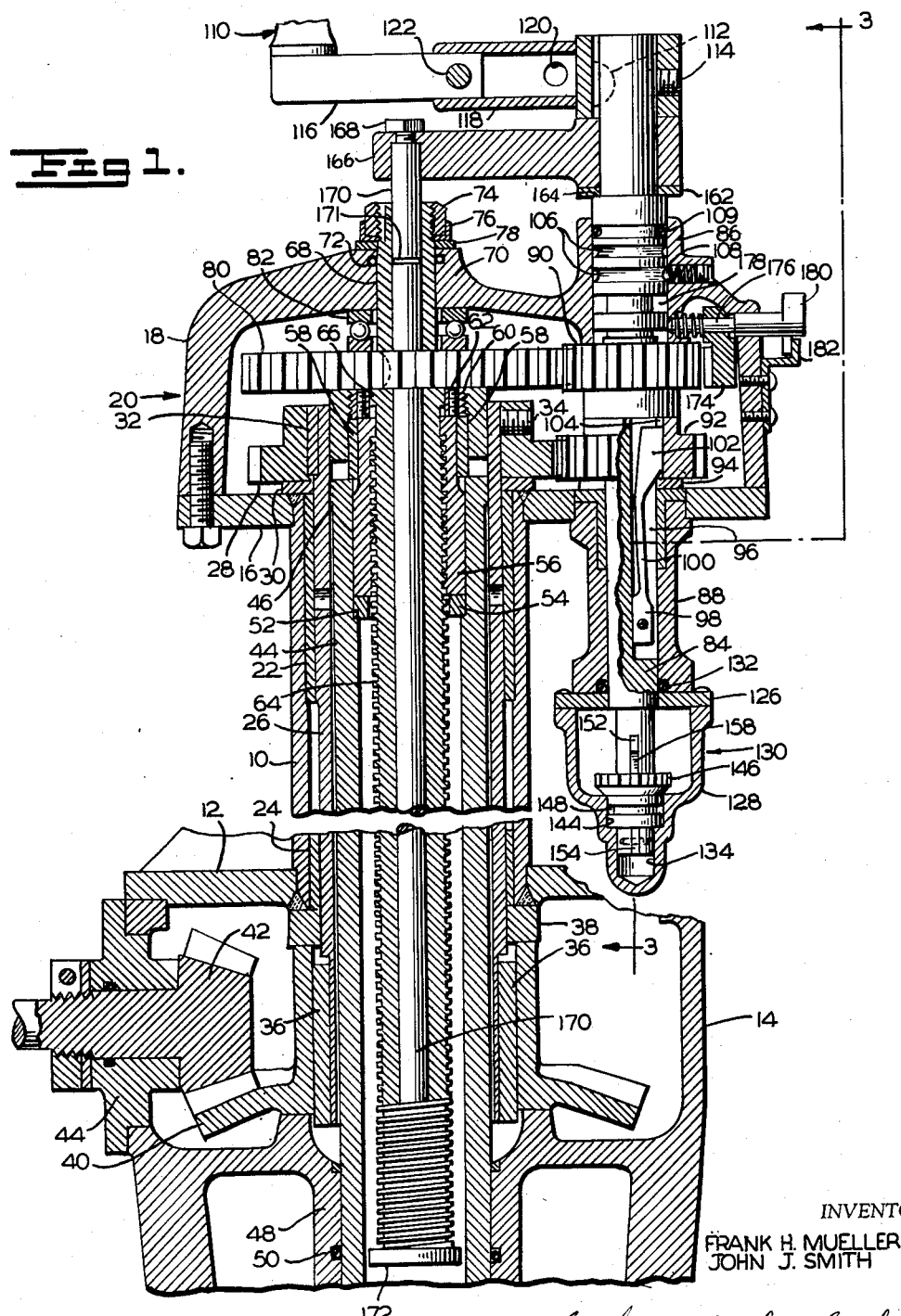
Figure 1 is a fragmentary vertical sectional view of a drilling machine embodying this invention and showing the drilling machine adjusted for automatic drive of the feed mechanism for the boring bar.

Referring now to the drawings, there is shown in Figure 1 a drilling machine having a barrel 10 provided with a bottom flange 12 forming the top wall of a housing 14. At its upper end the barrel 10 is provided with a plate-like circumferential flange 16 which, in conjunction with an inverted bowl-like top cap 18 bolted thereto, constitutes a housing 20 provided with a lifting handle 21 (see Figure 3).

Journalled in bushings 22 and 24 in the upper and lower ends, respectively, of the barrel 10 is a drive tube 26 which is suspended from a gear 28 that is supported by a thrust washer 30. A key 32 and a set screw 34 secure the drive tube 26 to the gear 28. Fixed, as by keys 36, to the lower end of the drive tube 26, within the housing 14 beneath a thrust washer 38, is a bevel gear 40 engaged by a pinion gear 42 journalled in a bearing 44 bolted in a side wall of the housing 14. The pinion gear 42 may be suitably driven by an appropriate air motor, not shown. Received in the drive tube 26 is a hollow boring bar 44, the upper portion of which has a close sliding fit in the upper end of the drive tube 26 and is splined thereto by appropriate means, not shown, for rotation thereby and axial movement relative thereto. Beneath its upper portion, the boring bar 44, for the purpose of reducing friction, is externally reduced so that a downwardly facing shoulder 46 exists. The lower reduced portion of the boring bar 44 is journalled in a bearing 48 provided in a lower portion of the housing 14. The bearing 48 preferably is provided with an oil seal in the form of an O ring 50. The upper interior portion of the boring bar 44 is enlarged to provide a shoulder 52 which supports an inwardly overhanging abutment ring 54 against which is seated a coaxial nut 56. The nut 56 is secured against rotation to the bar 44 by keys 58 and further held in place by a retaining ring 60 threaded into the upper end of the boring bar and locked in place by set screws 62 bearing against the upper end of the nut.

A feed screw 64 is engaged with the nut 56 and extends axially within and out of the boring bar 44. Above its threaded portion, the screw 64 has a circumferential flange 66 surmounted by a cylindrical journal portion 68 which extends through a bearing portion 70 of the cap 18. Preferably, an O ring type of oil seal 72 is provided between the journal portion 68 of the screw 64 and the bearing portion 70 of the cap 18. The projecting outer end of the screw 64 has a retaining nut 74 threaded thereon and held by a lock washer 76 that bears against a thrust washer 78. A gear 80 is keyed to the journal portion 68 between the flange 66 and an anti-friction thrust bearing 82 interposed between the hub of the gear 80 and the upper wall of the cap 18.

An axially-shiftable shaft 84 is journalled in a bearing portion 86 of the housing 20, and in a bushed tubular bearing member 88 depending therefrom, in spaced parallel relation to the feed screw 64. Slidably keyed on the shaft 84 is a gear 90 in constantly meshing engagement with the gear 80 of the feed screw and bearing against the top wall of the housing. Rotatably mounted on the shaft 84 against the gear 90 is another gear 92 in constantly meshing engagement with the gear 28. A thrust washer 94 is interposed between the gear 92 and the bushed portion of the bearing member 88. The ratios of all the gears are such that when the gear 92 is fixed against rotation to the shaft 84, rotation of the gear 28 by the drive tube 26, drives the gear 80 in the same direction, but at a slightly reduced speed.

Figure 2:
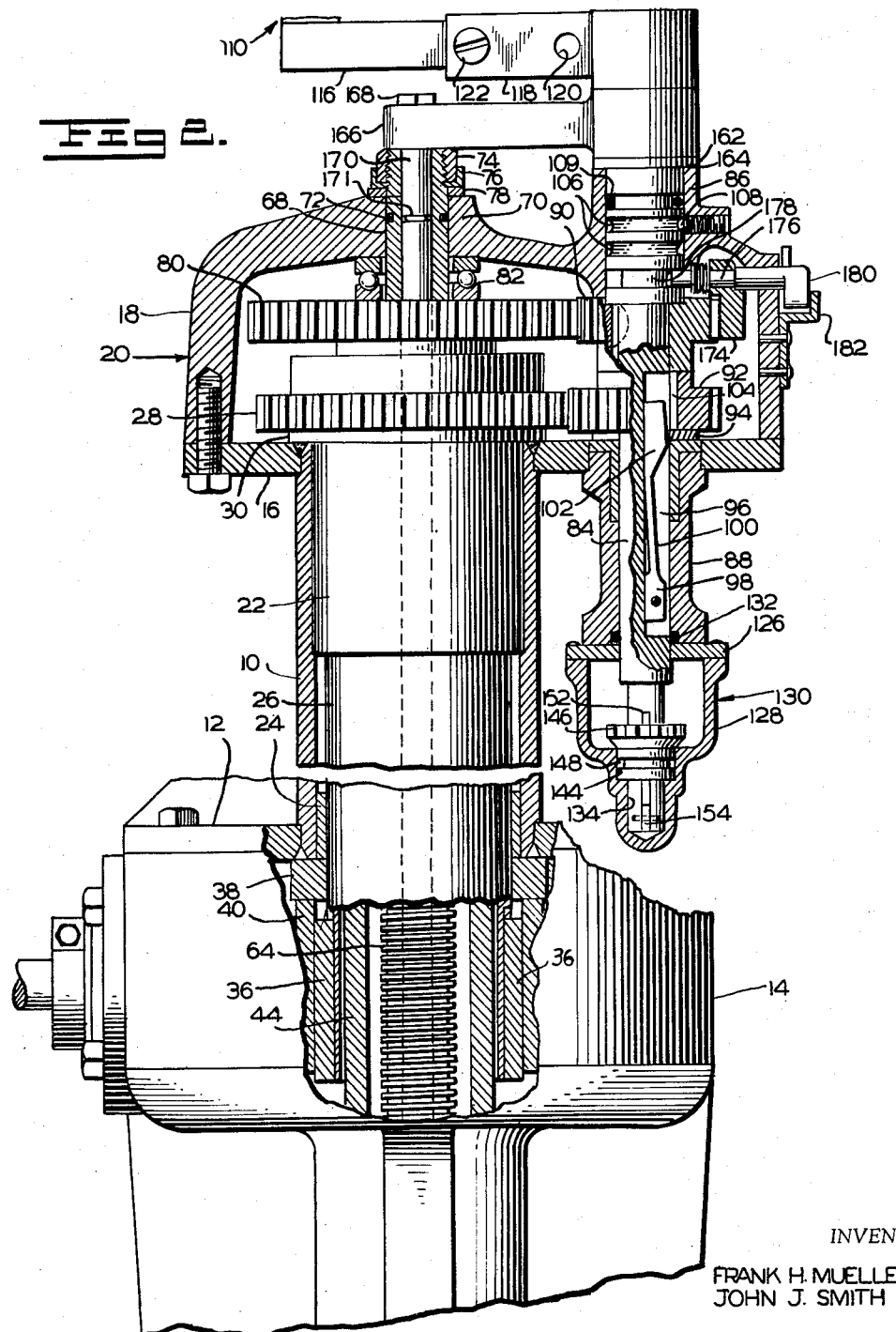
Figure 2 is a view corresponding to Figure 1 and showing the machine adjusted for hand drive of the feed mechanism.
Figure 7:
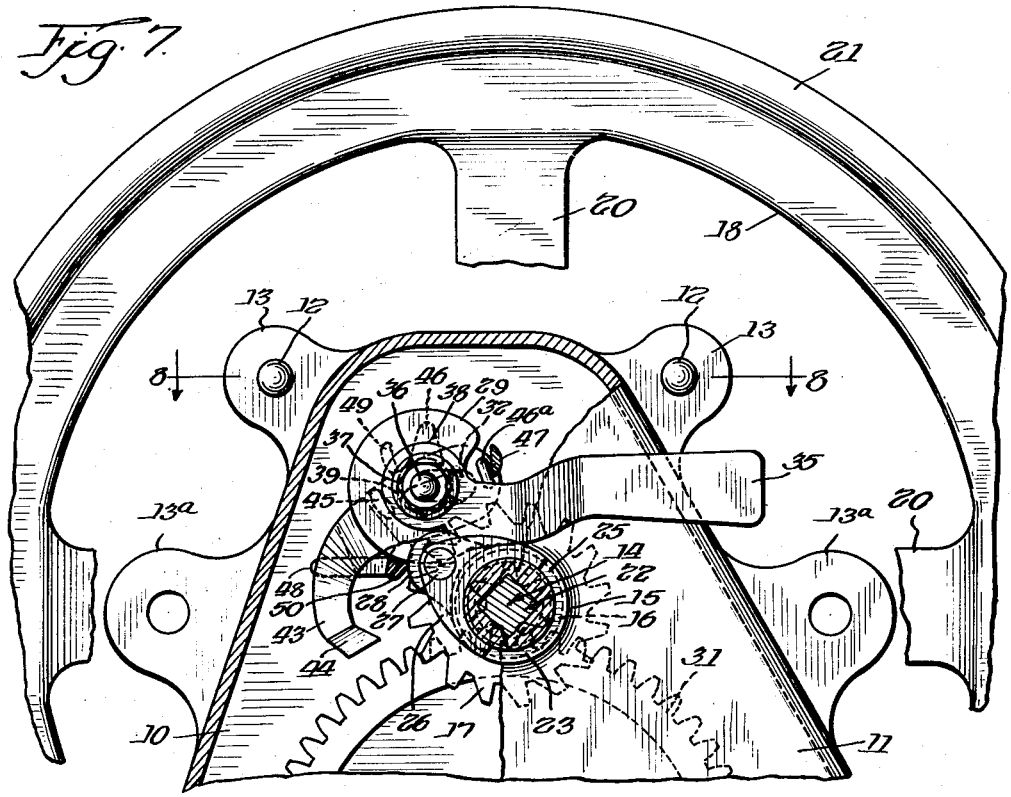
Figure 8:
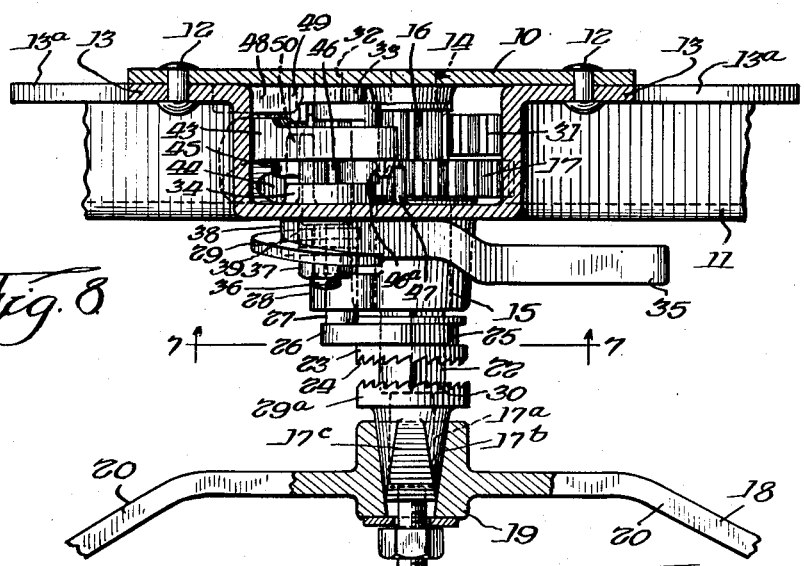

The shaft 84 has a longitudinally extending slot 96 in the lower end of which is pinned the foot portion 98 of a flat spring key 100 which is received with sliding clearance in the slot. The key 100 has a shank angled to a head 102 which, as shown in Figure 1, is yieldingly projected out of the slot 96 and into a longitudinal groove 104 in the interior of the hub of the gear 92, the groove receiving the head with sliding clearance. As shown in Figures 1 and 2, the angular upper portion, or shank, of the key 100 bears against an edge of the inner rim of the washer 94 at the lower end of the groove 104 in the gear 92.

Hence, when the shaft 84 is in the axial position shown in Figure 1, the key 100 projects into the groove 104 in the gear 92 so that when the drive tube 26 is rotated the gear 80 will be driven and thereby rotate the feed screw 64 at a somewhat smaller angular speed than the nut 56. Consequently, the nut 56 will be slowly threaded downwardly on the feed screw 64 for a slow advance of the boring bar 44. The spring key 100 and the grooved hub of the gear 92 thus constitute a clutch which is disengaged by shifting the shaft 84 downwardly to the axial position shown in Figure 2, thus causing the angular portion of the key, which bears against the edge of the washer 94, to cam the key 100 back into the slot 96 and out of driving engagement with the gear 92. In declutched position, manual rotation of the shaft 84, by means later described, while the drive tube 26 and consequently the nut 56 are at rest, rotates the feed screw 64 at a rate fast enough to rather rapidly thread the nut 56 downwardly thereon for a fast advance of the boring bar 44. For the purpose of retaining the shaft 84 in either of its axial positions, it is provided with spaced circumferential grooves 106 for reception of a spring-pressed ball detent 108 mounted in the bearing portion 86 of the housing 20. An oil seal 109 of the O ring type preferably is interposed between the shaft 84, above the grooves 106, and the bearing portion 86 of the housing 20.

The projecting upper end of the shaft 84 is reduced and has a crank handle 110 affixed thereto, as by a key 112 and a set screw 114, for manually rotating the shaft. Preferably, the crank arm of the handle 110 is extensible, as by means of telescoping portions 116 and 118, at least one of which has longitudinally spaced threaded openings 120 for reception of a retaining screw 122.

Supported on the lower end of the bearing member 88, as by screws 124, is a transverse counter-supporting plate 126 which, in conjunction with a bowl-like cover 128 screwed thereto, forms a housing 130. Preferably, the plate 126 also serves as a retainer for an O ring oil seal 132 positioned in an inner circumferential recess at the lower end of the bearing member 88. A reduced lower end of the shaft 84 projects into the housing 130 and is journalled in a bearing portion 134 in the interior of the cover 128. A counter 136 having a reset knob 138 is mounted on the plate 126, with the drive shaft 139 thereof projecting into the housing 130 and mounting a gear or star wheel 140. A conventional yieldable detent 142 engages the star wheel 140. Rotatably mounted on the reduced portion of the shaft 84 in a bearing recess 144 in the interior of the cover 128 is a gear 146 in constant meshing engagement with the star wheel 140. The gear 146 is restrained against axial movement by means of an outer circumferential groove 148 in its hub into which extends the smooth end of a set screw 150 mounted in the cover 128. The reduced portion of the shaft 84 is provided with a longitudinally extending slot 152 in the lower end of which is pinned the foot portion 154 of a flat spring key 156, similar in construction to the key 100. The key 156 is provided with a shank angled to a tooth-like head 158 which normally projects out of the slot 152 in position for driving engagement with the teeth on the gear 140. As shown best in Figure 3, the angular upper portion or shank of the key 156 bears against an inner rim of the gear 146, which latter is provided with an inner longitudinal groove or slot 160, similar in construction to the inner groove 104 of the gear 92.

From the foregoing construction it will be seen that when the shaft 84 is in the axial position shown in Figure 1, that is, when the feed of the boring bar is in automatic drive, one revolution of the shaft 84 serves to turn the gear 140 through a distance of one tooth by engagement of the key head 158 therewith. When the shaft is shifted axially, however, into the position shown in Figure 2 to declutch the automatic drive, the angular shank of the key 156 cams its tooth-like head 158 back into the slot 152 out of position to engage the gear 140. Simultaneously, or with a partial revolution of the shaft 84, the key 156 engages in the slot 160 in the gear 146 to key the latter to the shaft 84 for rotation therewith. By means of this construction, compensation is had in the counter drive for the different rates of advance of the boring bar 44 effected by automatic drive and by manual drive of the feed mechanism.

The following operative specifications are given as an example:

| | |
|---|---|
| Pitch of feed screw 64 | 1/8'' |
| Number of teeth on gear 28 | 63 |
| Number of teeth on gear 92 | 28 |
| Number of teeth on gear 80 | 65 |
| Number of teeth on gear 90 | 26 |
| Number of teeth on gear 146 | 9 |
| Number of teeth on gear 140 | 18 |

With these proportions, when the shaft 84 is positioned for automatic drive, the boring bar 44 will advance 1/10'' upon 8 revolutions thereof. For 8 revolutions of the boring bar 44, the shaft 84 makes 18 revolutions. With 18 revolutions of the shaft 84, the key 156 turns the counter gear 140 through one revolution. Such one revolution of the counter gear 140 effects an indication on the counter 136 of 1/10'' advance of the boring bar 44. When the shaft 84 is shifted from automatic to hand drive by means of the handle 110, one turn of the feed screw 64 will advance the boring bar 44⅛''. Hence, for a boring bar advance of 1/10'', the feed screw must advance 8/10 of a turn. Eight-tenths of a turn of the feed screw is effected by two revolutions of the shaft 84, which two revolutions simultaneously turn the counter gear 140 by means of the gear 146 through one complete revolution to indicate 1/10'' advance of the boring bar on the counter.

From the above construction it will be seen that accurate measurement of the advance, or retraction, of the boring bar is obtained at all times, irrespective of whether the machine is adjusted for hand or automatic feed. This feature is particularly important in a tool of this character having a fast hand feed in order to rapidly advance the cutting tool into contact with the pipe to be cut. At this time, the counter need not necessarily be reset to zero, but merely the reading thereof taken and recorded. Thereafter the machine is adjusted for automatic feed and power drilling commences. The reading of the counter at any time thereafter, minus the reading taken at the time of adjusting for automatic feed, will indicate the extent of advance of the cutting tool into the pipe being cut.

Rotatably mounted on the reduced upper end of the shaft 84 and held against axial movement thereon by the hub of the handle 110 and a thrust washer 162 seated against a shoulder 164 on the shaft, is a radial arm 166. Secured to the outer end of the radial arm 166, as by a screw 168, is a rod 170 which is slidably received in an axial bearing extending throughout the length of the feed screw 64. Preferably an O ring seal 171 is interposed between the rod 170 and its bearing. The lower end of the rod 170 projects out of the lower end of the feed screw 64 and has a disc 172 secured thereto which preferably bears against the lower end of the feed screw when the machine is in automatic feed, as best shown in Figure 1. This disc 172 has a running clearance with the inner cylindrical wall of the boring bar 44 and thus serves to steady the lower end of the feed screw 64.

When the machine is in automatic feed, as shown in Figure 1, advance of the boring bar 44 causes the ring 52 to eventually contact with the disc 172. Continued advance of the boring bar 44, by automatic drive of the feed mechanism, will cause the ring 52 to move the disc 172, and therewith the rod 170 and arm 166, downwardly to thereby shift the shaft 84 from the axial position thereof shown in Figure 1 to the axial position shown in Figure 2. This shifting movement of the shaft 84 will disengage the clutch constituted by the key 100 and the grooved hub of the gear 92, to thereby declutch the automatic drive of the feed mechanism and arrest further advance of the boring bar 44 upon continued rotation thereof.

The automatic interruption of advancing feed at a predetermined point is of particular importance in the present instance, since if the advance is not arrested the shoulder 46 on the boring bar will abut the top of the bearing portion 48 of the housing 14 with the possibility of considerable damage to the machine.

A normally-disengaged detent 174 adapted for locking engagement with the gear 90, is mounted within the housing 20 on a shiftable, spring-biased pin 176 extending through a wall of the housing 20, the inner end of such pin normally being blocked against inward movement by the shaft 84 when the latter is in automatic feed position. When the shaft 84 is shifted into hand feed position, however, a circumferential groove 178 in the shaft registers with the inner end of the pin 176, so that the latter may be pushed inwardly, to engage the detent 174 with the gear 90, and rotated to lock the same in such position by engagement of a lateral head 180 on the pin behind a retaining member 182 secured to the exterior of the housing 20, as shown in Figure 2. With the gear 90 locked against rotation, and the automatic drive disengaged, advance of the boring bar 44, when the latter is rotated by the drive tube 26, is governed solely by the pitch of the feed screw 64. The resulting rate of advance is suitable for tapping operations. It will be realized that, when the boring bar 44 is to be advanced by hand, as previously described, the detent 174 is in the position shown in Figure 1 and the position thereof shown in Figure 2 is for illustrative purposes only.

It will thus be seen that the objects of this invention have been fully and effectively accomplished. It will be realized, however, that the specific embodiment shown and described for the purpose of illustrating the principles of this invention is susceptible to various changes without departing from such principles. Therefore, this invention includes all modifications which are encompassed by the spirit and scope of the following claims.

We claim:
1. In a drilling machine having a projectible boring bar, feed mechanism therefor, an automatic drive for the feed mechanism to effect advance of the bar at a certain rate, shiftable means for rendering the automatic drive operative or inoperative, and a manually-operable drive for the feed mechanism to effect advance of the bar at a different rate when the automatic drive is inoperative, the combination of: rotatable counter means driven with the feed mechanism for measuring axial movement of the boring bar; a ratio-changer in the drive for said counter means; and means operable by the shiftable means for adjusting said ratio-changer to compensate for the different automatic and manual drive rates of advance of the boring bar.

2. In a drilling machine having a projectible boring bar, feed mechanism therefor, an automatic drive for the feed mechanism to effect advance of the bar at a certain rate, shiftable means for rendering the automatic drive operative or inoperative, and a manually-operable drive for the feed mechanism to effect advance of the bar at a different rate when the automatic drive is inoperative, the combination of: rotatable counter means driven with the feed mechanism for measuring axial movement of the boring bar; a ratio-changer in the drive for said counter means; means operable by the shiftable means for adjusting said ratio-changer to compensate for the different automatic and manual drive rates of advance of the boring bar; a shifter for said shiftable means; and abutment means moving with the boring bar and engageable with said shifter to shift the shiftable means to render the automatic drive inoperative after a predetermined advance of the boring bar.

3. A drilling machine comprising: a support; a boring bar mounted therein for axial and rotary movement; means for rotating said bar; a feed nut and a feed screw engaged therewith, one carried by said bar and the other by said support, for effecting axial movement of said bar; means for automatically driving one of said feed elements upon rotation of said bar to move the latter axially at a certain rate; clutch means in the automatic drive means; manually-operable means for driving said one feed element upon disengagement of said clutch means to move said bar axially at a different rate; a rotatable counter driven with said one feed element for measuring axial movement of said bar; and a change speed device in the drive for said counter, said device being changeable by operation of said clutch means to compensate for the different automatic and manual drive rates of axial movement of said bar.

4. A drilling machine comprising: a support; a boring bar mounted therein for axial and rotary movement; means for rotating said bar; a feed nut and a feed screw engaged therewith, one carried by said bar and the other by said support, for effecting axial movement of said bar; means for automatically driving one of said feed elements upon rotation of said bar to move the latter axially at a certain rate, said means including an axially-shiftable shaft offset from said bar and driven thereby; clutch means in the drive for said shaft and operable by shifting the latter; manually-operable means for driving said shaft when said clutch means is disengaged to move said bar axially at a different rate; a rotatable counter driven by said shaft for measuring axial movement of said bar; and a speed change device in the drive for said counter, said device being changeable by shifting said shaft to compensate for the different automatic and manual drive rates of axial movement of said bar.

5. A drilling machine comprising: a support; a boring bar mounted therein for axial and rotatory movement; means for rotating said bar; feed mechanism for said bar; means for automatically driving said feed mechanism to move said bar axially at a certain rate, said automatic driving means including an axially-shiftable shaft offset from said bar and driven thereby; clutch means in the drive for said shaft and operable by shifting the latter; manually operable means for driving said shaft when said clutch means is disengaged to move said bar axially at a different rate; a rotatable counter driven by said shaft for measuring axial movement of said bar; and a speed change device in the drive for said counter, said device being changeable by shifting said shaft to compensate for the different automatic and manual drive rates of axial movement of said bar.

6. The structure defined in claim 5 in which the speed change device comprises: a driven gear; two gears having different numbers of teeth mounted coaxially on the shiftable shaft and adapted, upon shifting movements thereof, to alternately drivingly engage said driven gear to drive the latter from said shaft.

7. The structure defined in claim 5 in which the speed change device comprises: a driven gear; a multiple-tooth driving gear constantly meshing therewith and rotatably mounted on the shiftable shaft, said driving gear having an interior radial slot; a radial tooth mounted in a recess in said shaft and spring biased outwardly for driving engagement with said driven gear, said tooth having a camming surface engageable against an end of said driving gear and operable by shifting said shaft for withdrawing said tooth from driving engagement with said driven gear and for forcing said tooth into said slot in said driving gear for locking the latter to said shaft for rotation therewith.

8. The structure defined in claim 4 including a shaft shifter and abutment means moving with the boring bar and engageable with said shifter to shift said shaft in a direction to disengage the clutch means after a predetermined advance of said bar.

9. A drilling machine comprising: a support; a boring bar mounted therein for axial and rotary movement; means for rotating said bar; a feed nut and a feed screw engaged therewith, one carried by said bar and the other by said support, for effecting axial movement of said bar; means for automatically driving one of said feed elements upon rotation of said bar to move the latter axially, said means including an axially-shiftable shaft offset from said bar and driven thereby; clutch means in said automatic driving means operable by shifting said shaft; a shaft shifter; and abutment means moving with said bar and engageable with said shifter to shift said shaft in a direction to disengage said clutch means after a predetermined advance of said bar.

10. A drilling machine comprising: a support; a boring bar mounted therein for axial and rotary movement; means for rotating said bar; a feed nut and a feed screw engaged therewith, one carried by said bar and the other by said support, for effecting axial movement of said bar; means for automatically driving one of said feed elements upon rotation of said bar, said means including an axially-shiftable shaft offset from said bar and driven thereby; clutch means in the drive for said shaft and operable by shifting the latter; and detent means operable upon disengagement of said clutch means for locking said one feed element against rotation.

11. A drilling machine comprising: a support; a boring bar mounted therein for axial and rotary movement; means for rotating said bar; a feed nut carried by and positioned within said bar; a feed screw mounted in said support and engaging said nut; means for automatically driving said screw upon rotation of said bar to move the latter axially at a certain rate, said means including an axially-shiftable shaft offset from said bar and driven thereby; clutch means in the drive for said shaft and operable by shifting the latter; manually-operable means for driving said shaft when said clutch means is disengaged and said bar is rotationally at rest to move said bar axially at a different rate; a counter having a driving gear for measuring axial movement of said bar; and two gears having different numbers of teeth mounted coaxially on said shaft for alternate driving engagement with said counter driving gear upon shifting movements of said shaft, the two different drive ratios so had for said counter being effective to compensate for the different automatic and manual drive rates of advance of said boring bar.

12. The structure defined in claim 11 including detent means operable upon disengagement of the clutch means for locking the shaft against rotation and axial movement.

FRANK H. MUELLER.
JOHN J. SMITH.

References Cited in the file of this patent

UNITED STATES PATENTS

| Number | Name | Date |
| --- | --- | --- |
| 1,862,866 | Storm | June 14, 1932 |
| 2,470,044 | Mueller et al. | May 10, 1949 |